United States Patent [19]

Takeda et al.

[11] Patent Number: 5,185,601
[45] Date of Patent: Feb. 9, 1993

[54] ACTIVE MATRIX LIQUID CRYSTAL DISPLAY APPARATUS AND METHOD OF PRODUCING THE SAME

[75] Inventors: Mamoru Takeda, Hirakata; Tatsuhiko Tamura, Neyagawa; Sadayoshi Hotta, Hirakata, all of Japan

[73] Assignee: Matsushita Electric Industrial Co., Ltd., Osaka, Japan

[21] Appl. No.: 638,537

[22] Filed: Jan. 8, 1991

[30] Foreign Application Priority Data

Jan. 11, 1990 [JP] Japan .................................. 2-4155

[51] Int. Cl.$^5$ ............................................... G09G 3/36
[52] U.S. Cl. ........................................ 340/784; 359/59; 428/1
[58] Field of Search ............... 350/333, 336; 357/23.7; 340/784 CL; 359/59; 428/1

[56] References Cited

U.S. PATENT DOCUMENTS

| | | | |
|---|---|---|---|
| 4,723,838 | 2/1988 | Aoki et al. ......................... | 350/336 |
| 4,761,058 | 8/1988 | Okubo et al. ...................... | 350/331 T |
| 4,955,697 | 9/1990 | Tsukada et al. ................... | 340/784 CL |
| 5,032,883 | 7/1991 | Wakai et al. ...................... | 357/23.7 |

OTHER PUBLICATIONS

16:6: Full-Color Multi-Gap LC-TV Display Panel Addressed by a-Si TFTs, Sadayoshi Hotta et al., Matsushita Electric Industrial Co., Ltd., Osaka, Japan, SID 86 Digest, pp. 296-297.

Primary Examiner—Jeffery A. Brier
Assistant Examiner—A. Au
Attorney, Agent, or Firm—Wenderoth, Lind & Ponack

[57] ABSTRACT

A liquid crystal display apparatus includes a transistor array substrate having formed thereon an array of pixel electrodes arranged in a matrix to form pixels, an array of switching thin film transistors arranged in a matrix for driving the pixels, respectively, gate bus lines arranged in rows for applying scanning signals to the switching thin film transistors, and source bus lines arranged in columns for applying display data signals to the switching thin film transistors. A counter substrate has formed thereon a common counter electrode confronting the pixel electrodes, and a liquid crystal layer is sandwiched between the transistor array substrate and the counter substrate. The transistor array substrate further has formed thereon a common electrode disposed below the pixel electrodes through an insulating layer for constituting auxiliary capacitors with the pixel electrodes. The common electrode is extended to cover an area above each source bus line or each gate bus line through another insulating layer so as to shield the pixel electrodes from the source or gate bus lines.

6 Claims, 14 Drawing Sheets

ACTIVE MATRIX LIQUID CRYSTAL DISPLAY APPARATUS AND METHOD OF PRODUCING THE SAME

BACKGROUND OF THE INVENTION

1. Field of the Invention

The present invention relates to an active matrix liquid crystal display apparatus having an array of liquid crystal pixels driven by an array of thin film transistor (TFT) switching elements which are selected on a row by row basis by scanning signals applied to row electrodes (scanning electrodes) and which have display data signals applied thereto via column electrodes (signal electrodes) to control the switching elements in a selected row.

2. Description of the Prior Art

The active matrix liquid crystal display apparatus is known. The apparatus basically includes upper and lower substrates having sandwiched therebetween a liquid crystal layer. Provided on the lower substrate are signal bus lines arranged in columns, scanning bus lines arranged in rows, pixel electrodes arranged in an area between two adjacent signal bus lines and two adjacent scanning bus lines to form a liquid crystal pixel, and, as active switching elements, thin film transistors (TFTs) respectively connected to a corresponding pixel electrode, a corresponding signal bus line and a corresponding scanning bus line. Provided on the upper substrate is a common counter electrode.

The apparatus is operated by applying a scanning voltage to the scanning bus liens on a row by row basis while applying display data signal voltages to the signal bus lines for the display of data of the pixel electrodes in a scanned row. The voltage applied to the pixel electrode (applied across the pixel electrode and the common counter electrode) changes or maintains the optical state (bright, dark, grey) of the liquid crystal between the pixel electrode and the common counter electrode to effect a display corresponding to the display data. The pixel electrode and the common counter electrode form a capacitor for holding the applied voltage to maintain the optical state during one scanning period.

In such an active matrix liquid crystal display apparatus, it has been proposed to form auxiliary capacitors each being parallel to the capacitor formed by a pixel electrode and the common counter electrode so as to improve the voltage holding characteristic of each pixel. A conventional method for forming the auxiliary capacitor by providing a common electrode below the pixel electrode, gate bus line and source bus line is disclosed by S. Hotta et al. in a paper title "Full-Color Multi-Gap LC-TV Display Panel Addressed by a-Si TFTs", SID 86 DIGEST, No. 16-6, pp. 296-297. In this method, however, when the display density of the display apparatus is increased (i.e., when the number of pixels per unit area is increased by reducing the sizes of the pixel electrodes, signal and scanning bus lines and TFTs), the voltage of each pixel will be affected by an electric field leaked from the signal and scanning bus lines, whereby the display quality will be deteriorated.

SUMMARY OF THE INVENTION

Accordingly, an object of the present invention is to provide an active matrix liquid crystal display apparatus in which a common electrode for forming auxiliary capacitors is formed such that the pixel electrodes are scarcely affected by electric field leakage from signal bus lines or scanning bus lines.

To achieve this object, according to the present invention, a common electrode for constituting auxiliary capacitors is formed between pixel electrodes and source bus lines or between pixel electrodes and gate bus lines so as to electromagnetically shield the pixel electrodes from the source bus lines or gate bus lines.

A liquid crystal display apparatus of the present invention includes a transistor array substrate having formed thereon an array of pixel electrodes arranged in a matrix to form pixels, an array of switching transistors arranged in a matrix for driving the pixels, respectively, gate bus lines arranged in rows for applying scanning signals to the switching transistors, and source bus lines arranged in columns for applying display data signals to the switching transistors, a counter substrate having formed thereon a common counter electrode confronting the pixel electrodes, and a liquid crystal layer sandwiched between the transistor array substrate and the counter substrate, wherein the transistor array substrate has formed thereon a common electrode disposed below the pixel electrodes through an insulating layer for constituting auxiliary capacitors with the pixel electrodes, the common electrode being extended to cover an area above each source bus line or each gate bus line through an insulating layer so as to shield the pixel electrodes from the source bus lines or gate bus lines.

Since the common electrode for forming the auxiliary capacitors is disposed such that the pixel electrodes are electromagnetically shielded from the source bus lines or gate bus lines, the pixel electrodes will be scarcely affected by electric field leakage from the source bus lines or gate bus lines. Accordingly, a uniform voltage-brightness characteristic can be obtained, and a high contrast and high quality display can be realized.

DESCRIPTIONS OF THE PREFERRED EMBODIMENTS

Figure 1:
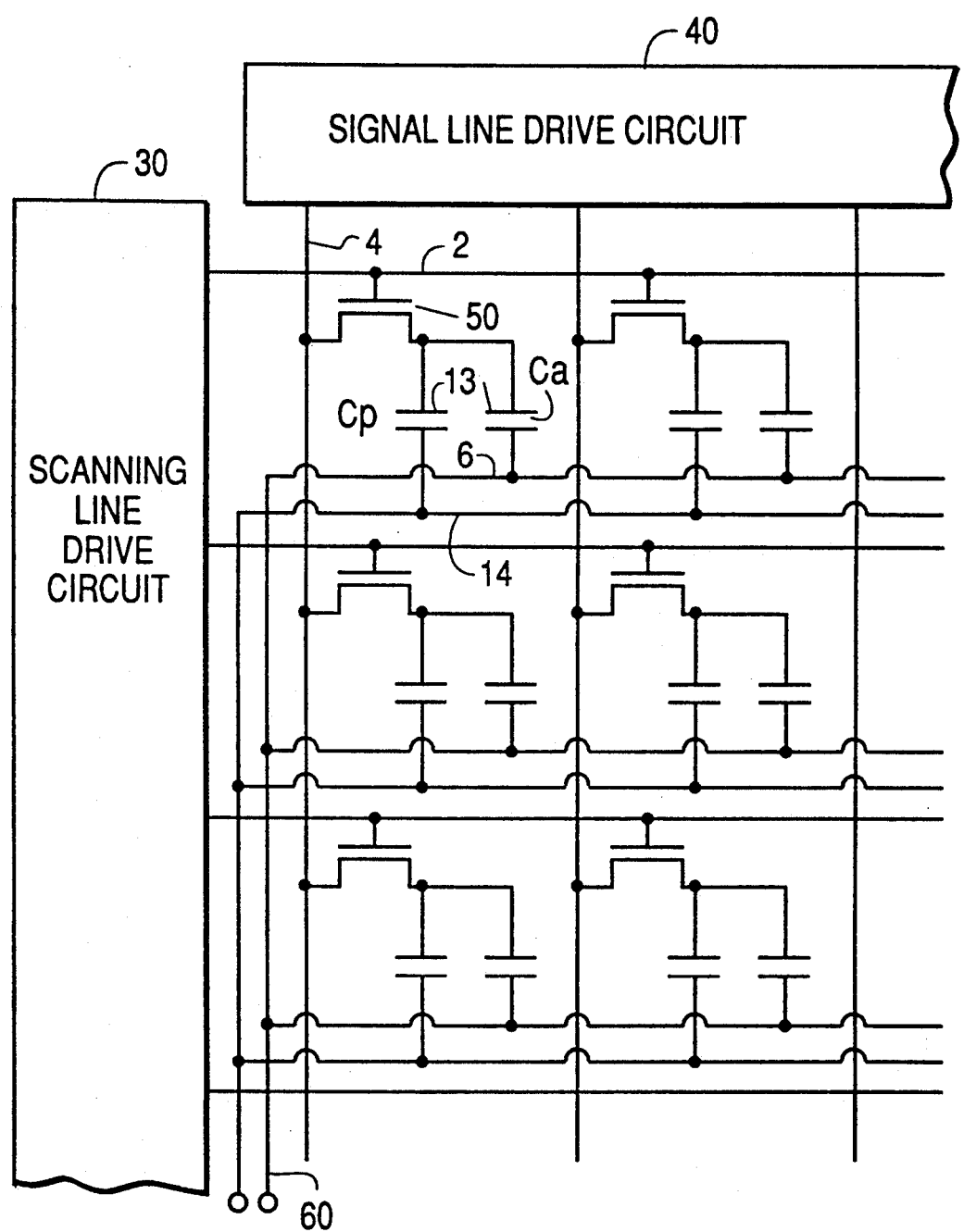
FIG. 1 is an equivalent circuit diagram of a liquid crystal display apparatus of a first embodiment of the present invention.
Figure 2:
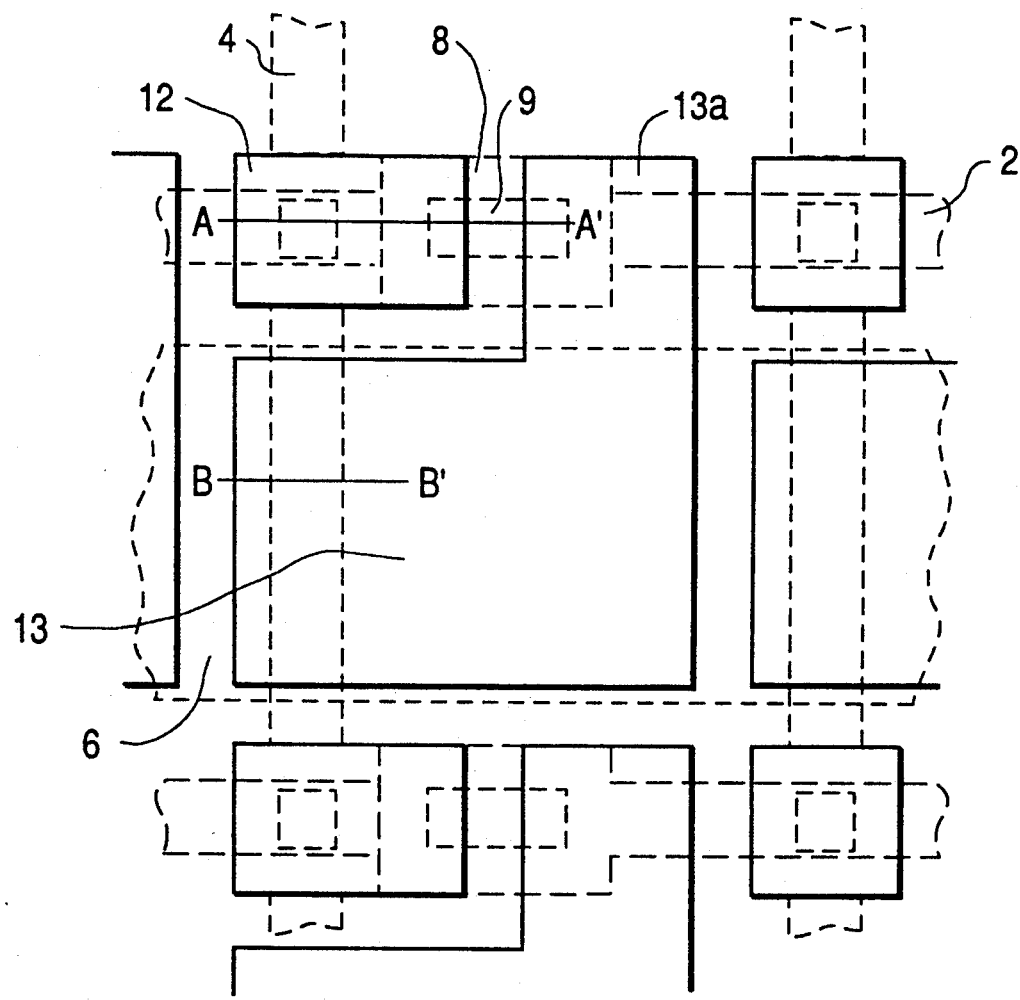
FIG. 2 is a schematic top view showing a part of a lower substrate in the liquid crystal display apparatus of the first embodiment.
Figure 3:
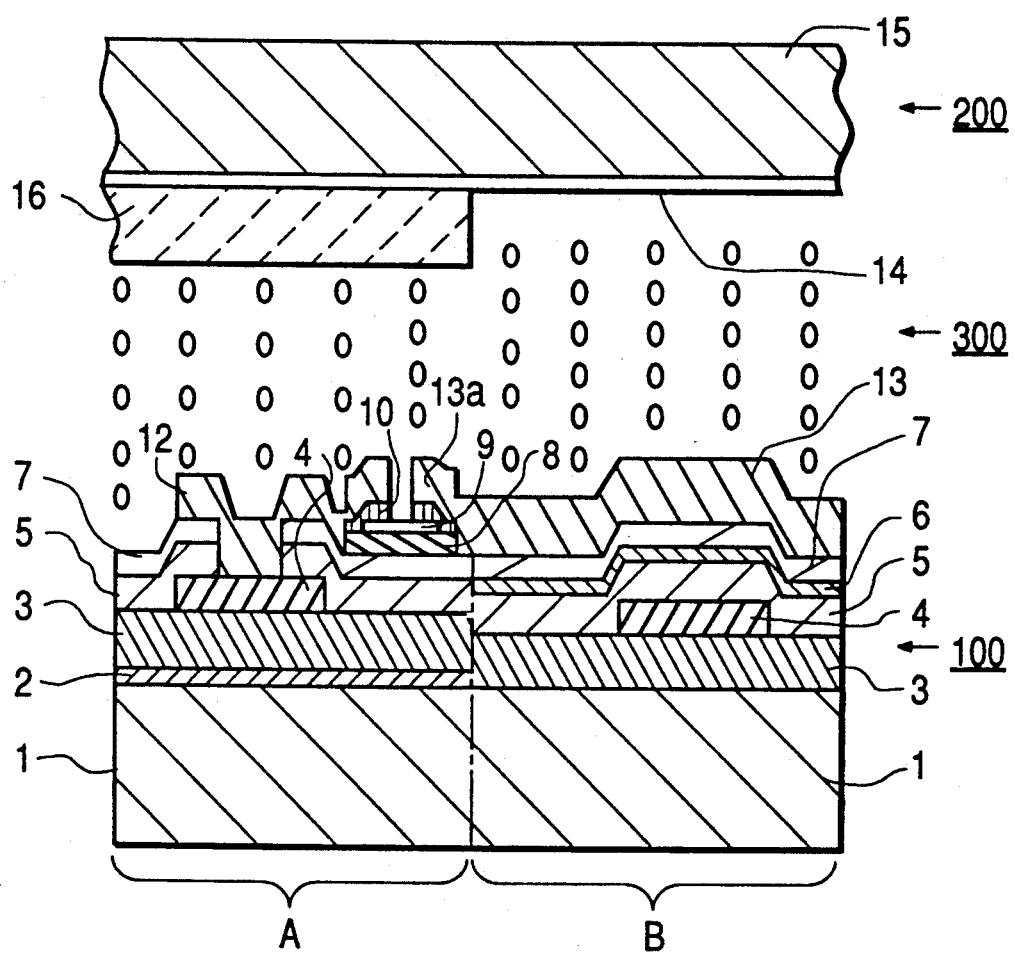
FIG. 3 is a schematic sectional view along lines A—A' and B—B' in FIG. 2.

An active matrix liquid crystal display apparatus of a first embodiment of the present invention is shown in FIGS. 1, 2 and 3. FIG. 2 is a schematic top view showing a part (in the vicinity of pixel) of a lower substrate in the liquid crystal display apparatus, and FIG. 3 is a schematic sectional view along lines A—A' and B—B' in FIG. 2. The left side portion of FIG. 3 shows a sectional view along the line A—A' line in FIG. 2 (referred to as area A, hereinafter), which includes the TFT (thin film transistor) formed area, and the right side portion of FIG. 3 shows a sectional view along the line B—B' in FIG. 2 (referred to as area B, hereinafter).

In the liquid crystal display apparatus, a liquid crystal layer 300 is sandwiched between upper and lower substrates 200 and 100. The upper substrate 200 comprises a transparent substrate 15, a transparent common counter electrode 14 formed on the transparent substrate 15 on the surface facing the lower substrate, and a black matrix 16 formed on the common counter electrode 14.

The lower substrate 100 has formed thereon gate bus lines (scanning lines) 2 arranged in rows, source bus lines (signal lines) 4 arranged in columns, pixel electrodes 13 arranged in a matrix for forming liquid crystal pixels, thin film transistors (TFTs) 50 respectively connected to the pixel electrodes 13, and common electrodes 6 for forming auxiliary capacitors. Each of the pixel electrodes 13 and common electrodes 6 is preferably a transparent electrode. Each TFT 50 is connected at its gate to a corresponding gate bus line 2, at its source to a corresponding source bus line 4, and at its drain to a corresponding pixel electrode 13. Each pixel electrode 13 and the common counter electrode 14 formed on the upper substrate 200 constitute a pixel capacitor Cp. The common electrodes 6 are formed in parallel to the gate bus lines 2, and commonly connected at ends thereof to a common line 60 so that each pixel electrode 13 and a common electrode 6 constitute an auxiliary capacitor Ca which is electrically connected in parallel to the pixel capacitor Cp. Scanning line drive circuit 30 applies scanning signals to the gate bus lines 2 to select pixels on a row by row basis. Signal line drive circuit 40 applies display data signals to the source bus lines 4 in synchronism with the scanning signals to change optical states of pixels in a selected row.

The structure of the lower substrate 100 at each pixel portion will be described in more detail with reference to FIGS. 2 and 3. An important structural feature resides in forming the common electrodes 6 for constituting auxiliary capacitors Cp between the pixel electrodes 13 and source bus lines 4 to electromagnetically shield the pixel electrodes from the source bus lines. The gate bus line 2 is formed on a transparent insulating substrate 1. The source bus line 4 is formed in a direction perpendicular to the gate bus line direction on the gate bus line-formed substrate through an insulating layer 3. In area A, a thin film transistor (TFT) area is formed on the substrate through further insulating layers 5 and 7. That is, the TFT area includes a semiconductor layer 8 formed on the insulating layer 7, and an impurity-doped semiconductor layer 10 formed on the semiconductor layer 8 and divided into two parts. Also, an insulating layer 9 is formed on the semiconductor layer 8 to serve as a passivation layer for protecting the exposed surface of the semiconductor layer 8. A source electrode 12 and a drain electrode 13a are formed on the two divided parts of the impurity-doped semiconductor layer 10. The source electrode 12 is connected to the source bus line 4 through a contact hole 11.

In area B, a common electrode 6 for forming an auxiliary capacitor is formed between insulating layers 5 and 7. The common electrode 6 extends in a direction parallel to the gate bus line direction and covers the area above the source bus line. A pixel electrode 13 is formed on the insulating layer 7. The pixel electrode 13 is an extension of the drain electrode 13a and extends above the source bus line 4 so as to obtain a large effective display area, or large aperture. The common electrode 6 is formed so that the pixel electrode 13 is electromagnetically shielded from the source bus line 4 by the common electrode 6. Accordingly, although the pixel electrode 13 extends above the source bus line 4, the pixel electrode 13 is scarcely affected by an electric field leaked from the source bus line 4.

Figure 4A:
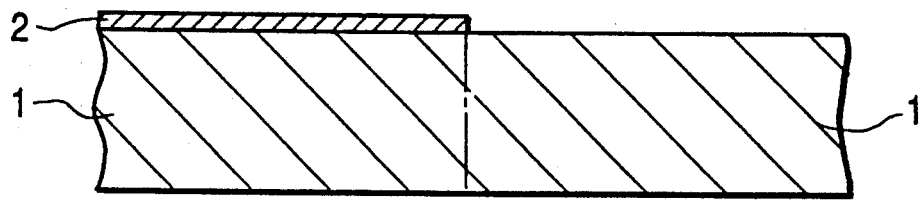
FIGS. 4(*a*) through (*i*) are schematic sectional views showing a method of producing the lower substrate shown in FIGS. 2 and 3.
Figure 4B:
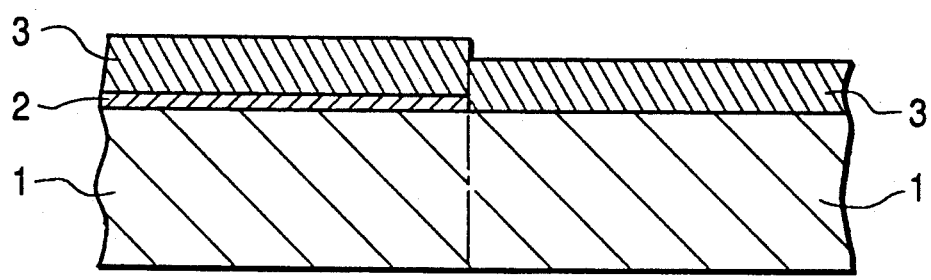
Figure 4C:
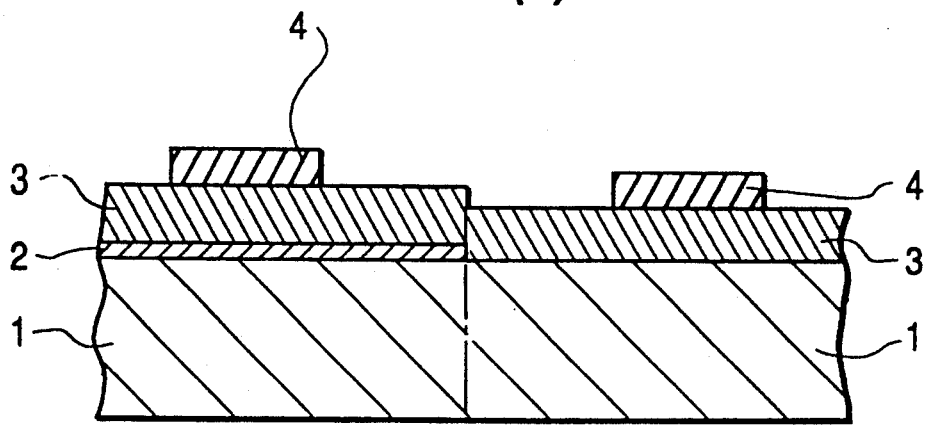
Figure 4D:
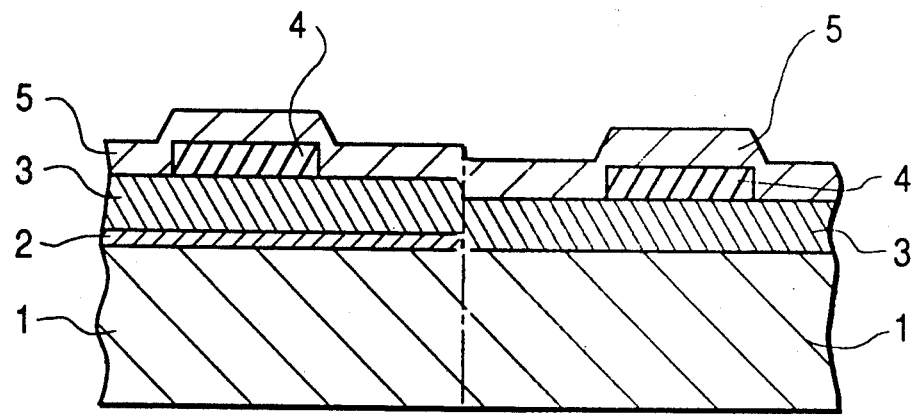
Figure 4E:
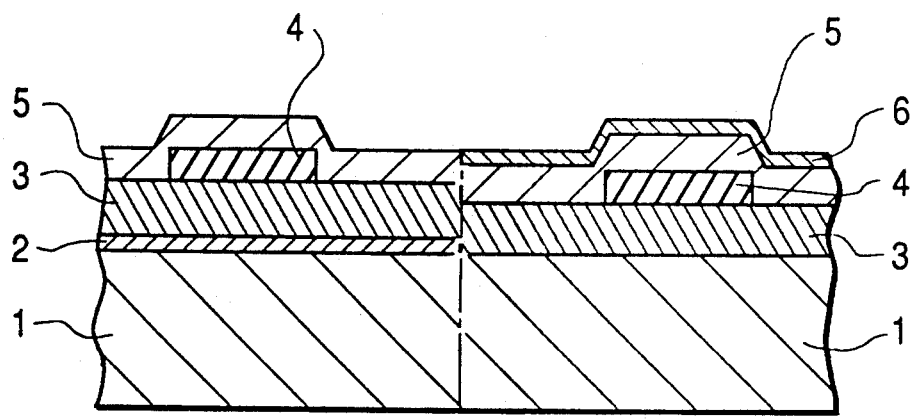
Figure 4F:
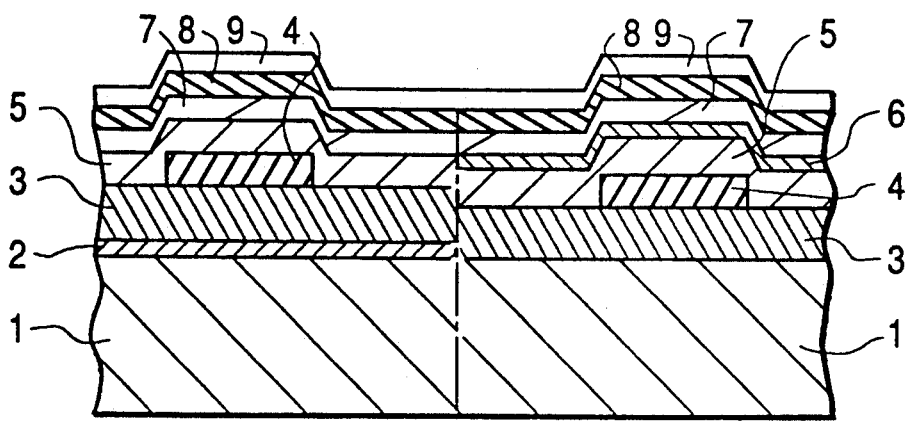
Figure 4G:
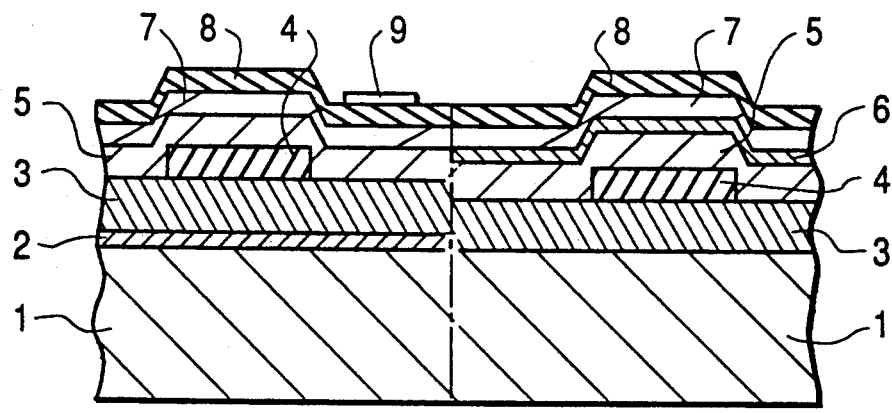
Figure 4H:
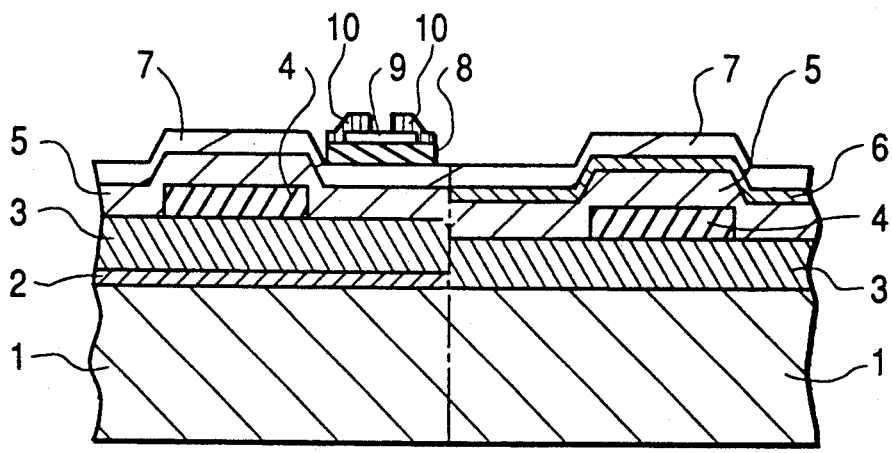
Figure 4I:
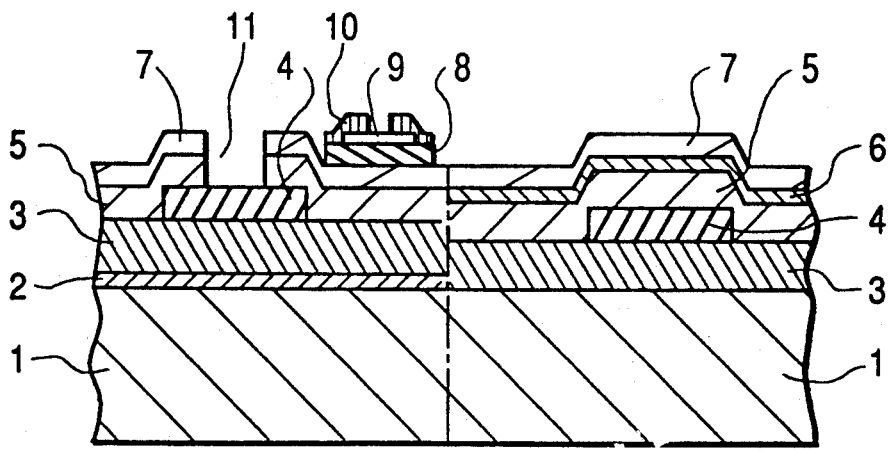

A method of producing the structure shown in FIGS. 2 and 3 will be described hereinafter with reference to FIGS. 4(a) through 4(i). First, a metal layer is sputtered on a transparent insulating substrate 1, and patterned into a gate bus electrode 2 by photolithography as shown in FIG. 4(a). The substrate 1 may be a glass substrate. The gate bus line 2 may be made of Cr, Ti or the like. An insulating layer 3 is formed over the gate bus line formed substrate by sputtering, CVD (chemical vapor deposition) or P-CVD (plasma-CVD) as shown in FIG. 4(b). The insulating layer 3 may be made of $SiO_2$, $SiN_x$ or the like. Next, a conductor layer is sputtered on the insulating layer 3 and patterned into a source bus line 4 by photolithography as shown in FIG. 4(c). The source bus line 4 may be made of Al, Ti, ITO (indiumtin-oxide), MoSi or the like. Next, an insulating layer 5 is formed over the source bus line formed substrate by sputtering, CVD or P-CVD as shown in FIG. 4(d). The insulating layer 5 may be made of $SiO_2$, $SiN_x$ or the like. Next, a conductor layer is sputtered on the insulating layer 5 and patterned into a common electrode 6 by photolithography as shown in Gis. 4(e). The common electrode 6 may be made of a transparent conductor material such as ITO or the like. Next, an insulating layer 7, a semiconductor layer 8 and an installing layer 9 are formed in this order on the common electrode formed substrate by sputtering, CVD or P-CVD as shown in FIG. 4(f). Each of the insulating layers 7 and 9 may be made of $SiO_2$, $SiN_x$ or the like. The semiconductor layer 8 may be made of a-Si (amorphous silicon), polysilicon or the like. The insulating layer 9 is patterned into a specific pattern at a TFT forming area as shown in FIG. 4(g). Next, on the substrate as shown in FIG. 4(g), an impurity-doped semiconductor layer 8 and impurity-doped semiconductor layer 10 are patterned into a specific pattern to form a thin film transistor part as shown in FIG. 4(h). The impurity may be P, B or the like. The impurity-doped semiconductor layer 10 may be p+- or n+-doped a-Si or poly Si. Next, a contact hole 11 for drawing out the source bus line is formed though the insulating layers 7 and 5 so that a specific part of the source bus line 4 near the TFT area is exposed as shown in FIG. 4(i). At this time, although not shown in the figures, a contact hole for drawing out the gate bus line 2 is also formed through the insulating layers 7, 5 and 3 near the periphery of the substrate. Finally, a conductor layer is sputtered on the substrate shown in FIG. 4(i), and patterned by photolithography into a source electrode 12, a drain electrode 13a and a pixel electrode 13 as shown in FIG. 3. At this time, although not shown in the figures, a gate bus draw-out electrode is also formed through the contact hole near the periphery of the substrate. The source, drain and pixel electrodes may be made of a transparent conductor material such as ITO or the like.

Figure 11:
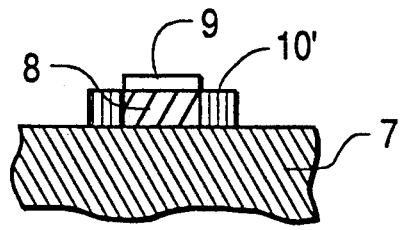
FIG. 11 is a schematic sectional view of a part of a thin film transistor having a modified structure.

The impurity-doped semiconductor layer may be formed in another manner as shown in FIG. 11. In the structure shown in FIG. 11, impurities are implanted or thermally diffused into a part of the semiconductor layer 8 to change the part of the semiconductor layer into an impurity-doped semiconductor layer 10'.

Figure 5:
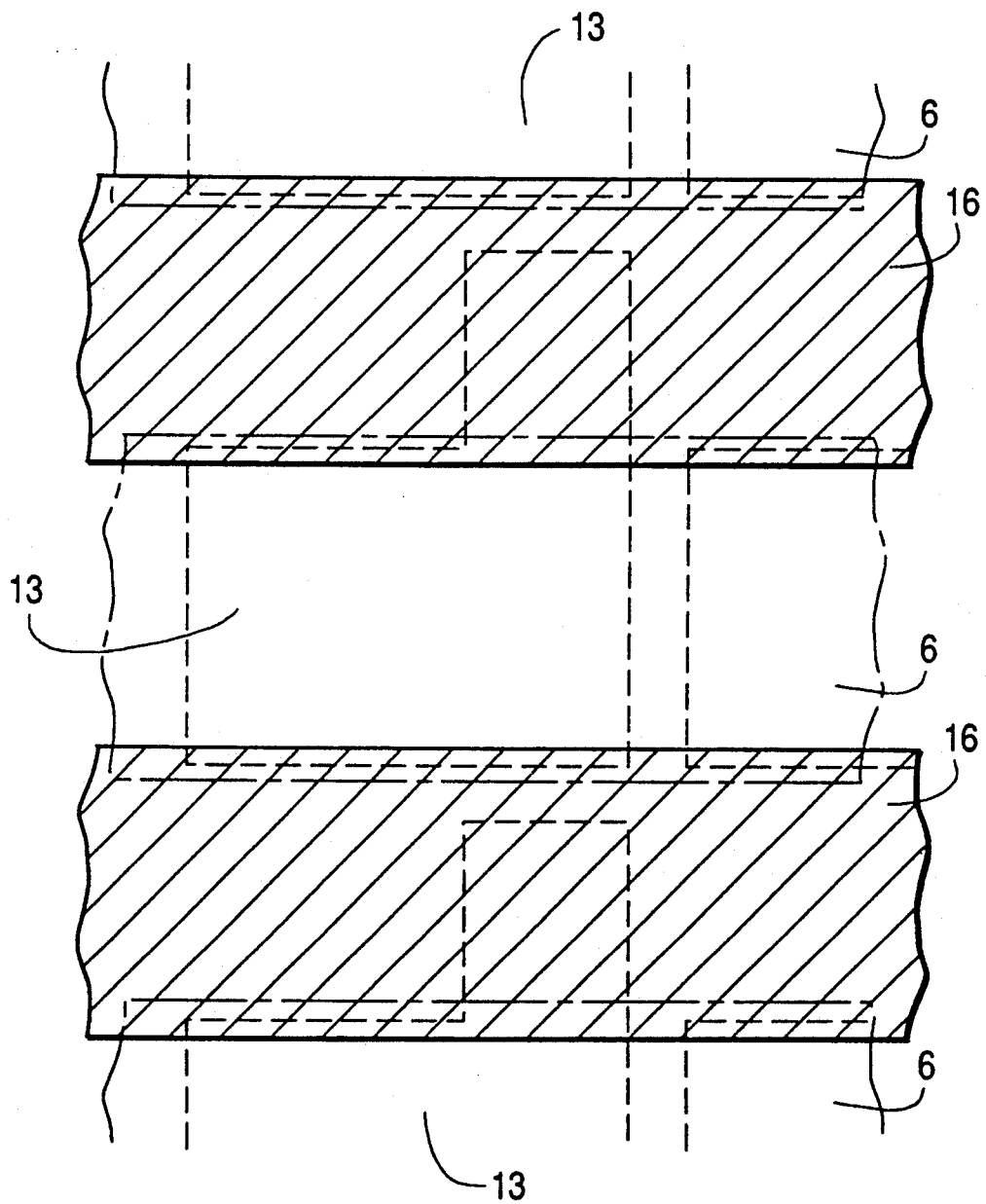
FIGS. 5 is a schematic top view showing a black matrix pattern of the liquid crystal display apparatus of the first embodiment.

The black matrix 16 formed on the common counter electrode 14 on the upper substrate 200 has a pattern as shown in FIG. 5. Conventionally, the black matrix is formed such that black stripes are arranged both in columns and rows to cover both the source bus lines and gate bus lines. However, in the pattern shown in FIG. 5, the black matrix 16 has a pattern of black stripes which are arranged only in rows to cover only the gate bus lines. In other words, the black matrix 16 covers an area except for the areas above the common electrodes 6. Since the black matrix 16 is not formed along the source bus lines 4, the pixel electrodes 13 can be extended above the source bus lines 4. Accordingly, a large effective display area, or large aperture, can be obtained.

Figure 6:
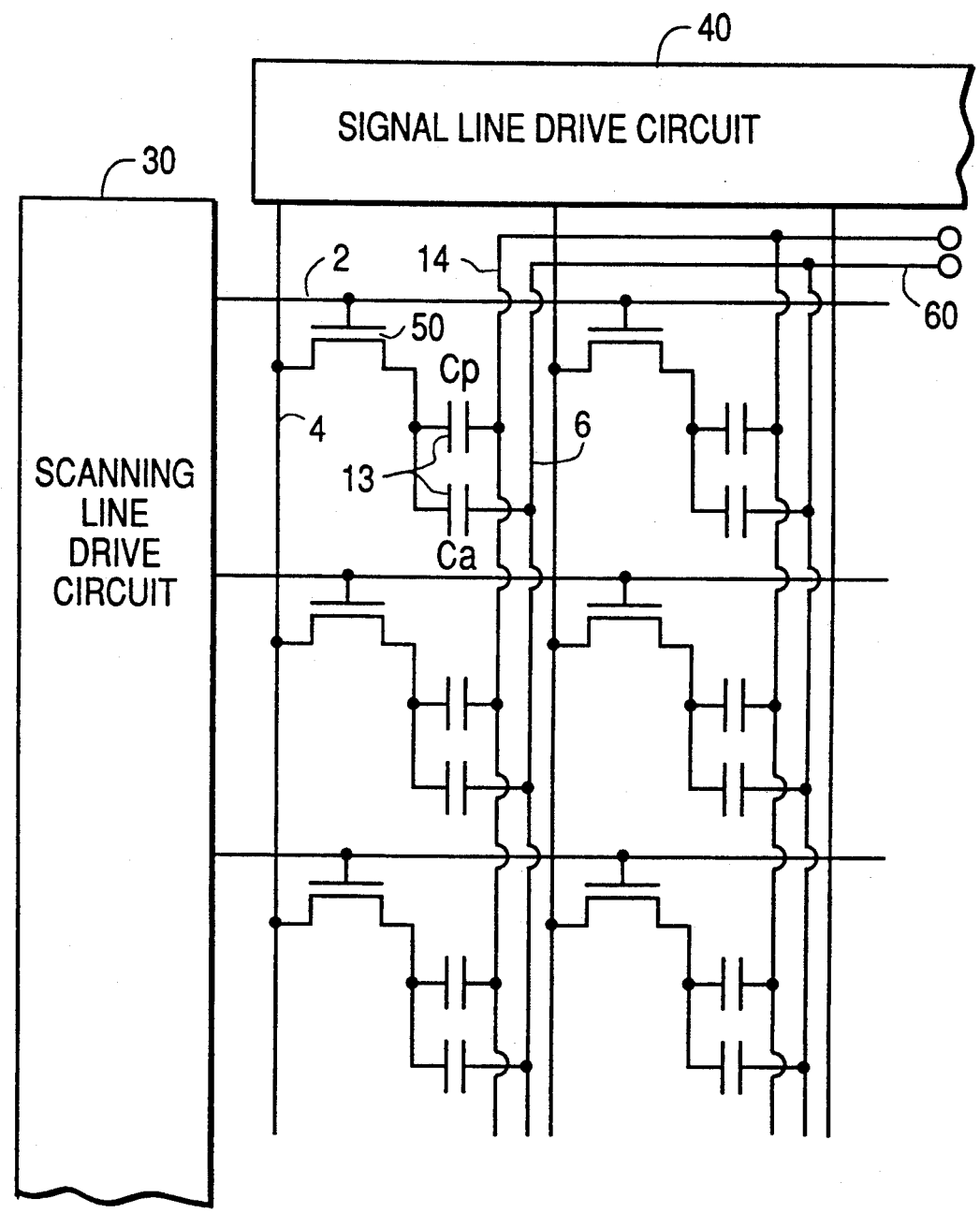
FIG. 6 is an equivalent circuit diagram of a liquid crystal display apparatus of a second embodiment of the present invention.
Figure 7:
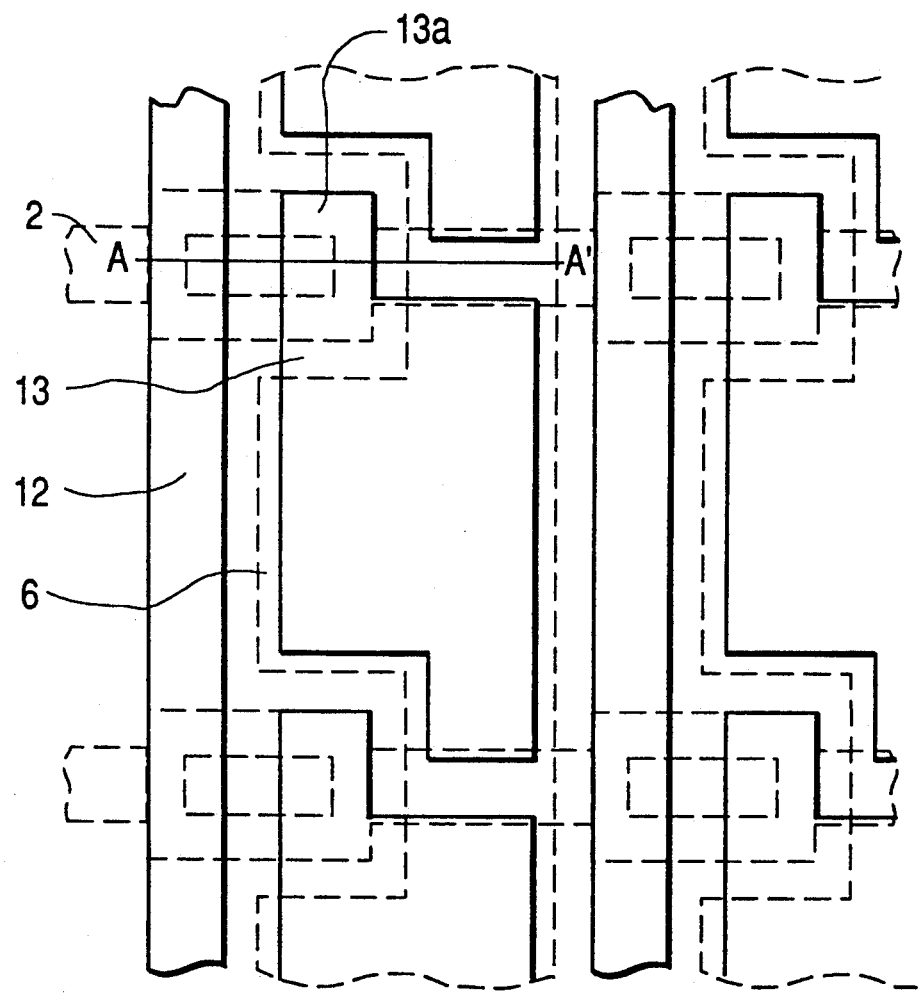
FIG. 7 is a schematic top view showing a part of a lower substrate in the liquid crystal display apparatus of the second embodiment.
Figure 8:
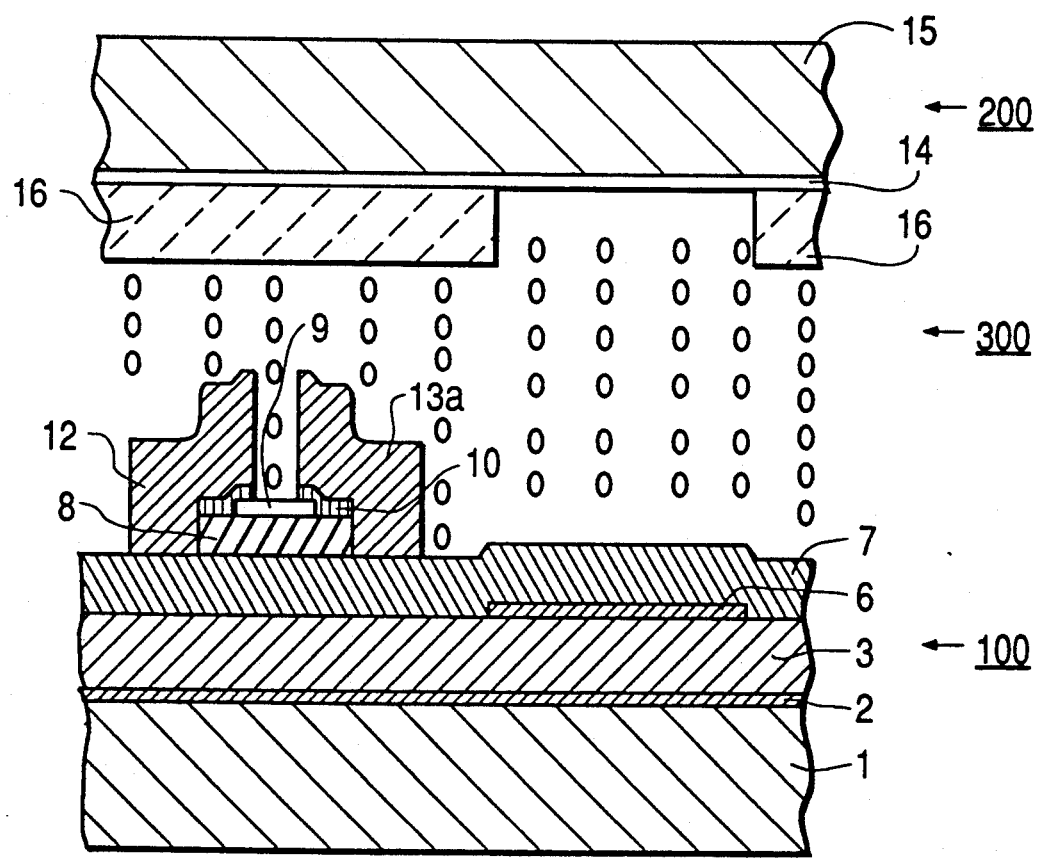
FIG. 8 is a schematic sectional view along line A—A' in FIG. 7.

An active matrix liquid crystal display apparatus of a second embodiment of the present invention is shown in FIGS. 6, 7 and 8. FIG. 6 is an equivalent circuit diagram of the liquid crystal display apparatus. FIG. 7 is a schematic top view showing a part (in the vicinity of a pixel) of a lower substrate in the liquid crystal display apparatus, and FIG. 8 is a schematic sectional view along line A—A' in FIG. 7.

In the second embodiment, the source bus line 4 is omitted, and the source electrode 12 is extended in the column direction to form a source bus line. The common electrodes 6 for the auxiliary capacitors are arranged in columns, i.e., in parallel to the source bus line direction. In other words, the common electrodes 6 cover the areas above the gate bus lines 2 so as to electromagnetically shield the pixel electrodes 13 from the gate bus lines 2. Thus, the pixel electrodes 13 are scarcely affected by electric field leakage from the gate bus lines 2. The ends of the common electrodes 6 are commonly connected to a common line 60 near the periphery of the substrate. The pixel electrode 13 is an extension of the drain electrode 13a.

The lower substrate 100 has formed thereon gate bus lines (scanning lines) 2 arranged in rows, source bus lines (signal lines) 12 arranged in columns, pixel electrodes 13 arranged in a matrix for forming liquid crystal pixels, thin film transistors (TFTs) 50 respectively connected to the pixel electrodes 13, and common electrodes 6 for forming auxiliary capacitors. Each of the pixel electrodes 13 and common electrodes 6 is preferably a transparent electrode. Each TFT 50 is connected at its gate to a corresponding gate bus line 2, at its source to a corresponding source bus line 12, and at its drain to a corresponding pixel electrode 13. Each pixel electrode 13 and the common counter electrode 14 formed on the upper substrate 200 constitute a pixel capacitor Cp. The common electrodes 6 are formed in parallel to the source bus lines 12, and are commonly connected at ends thereof to the common line 60 so that each pixel electrode 13 and a common electrode 6 constitute an auxiliary capacitor Ca which is electrically connected in parallel to the pixel capacitor Cp. Scanning line drive circuit 30 applies scanning signals to the gate bus lines 2 to select the pixels on a row by row basis. Signal line drive circuit 40 applies display data signals to the source bus lines 4 in synchronism with the scanning signals so as to change optical states of pixels in a selected row.

The structure of the lower substrate 100 at each pixel portion will be described in more detail with reference to FIGS. 7 and 8. An important structural feature resides in forming the common electrodes 6 for constituting auxiliary capacitors Cp between the pixel electrodes 13 and gate bus lines 2 to electromagnetically shield the pixel electrodes 13 from the gate bus lines 2. The gate bus line 2 is formed on a transparent insulating substrate 1. The source bus line 12 is formed in a direction perpendicular to the gate bus line direction on the gate bus line-formed substrate through insulating layers 2 and 7. A thin film transistor (TFT) area is formed on the substrate through the insulating layers 2 and 7. That is, the TFT area includes a semiconductor layer 8 and is divided into two parts. Also, an insulating layer 9 is formed on the semiconductor layer 8 to serve as a passivation layer for protecting the exposed surface of the semiconductor layer 8. A source electrode (source bus line) 12 and a drain electrode 13a are formed on the two divided parts of the impurity-doped semiconductor layer 10. The source electrode 12 is the same layer as the layer of the source bus line 12. A pixel electrode 13 is formed on the insulating layer 7. The pixel electrode 13 is an extension of the drain electrode 13a. The common electrode 6 for forming an auxiliary capacitor is formed between the insulating layers 2 and 7. The common electrode 6 extends in a direction parallel to the source bus line direction and covers the area above the gate bus line 2. In other words, the common electrode 6 is formed so that the pixel electrode 13 is electromagnetically shielded from the gate bus line 2 by the common electrode 6. Accordingly, the pixel electrode 13 is scarcely affected by an electric field leaked from the gate bus line 2.

Figure 9A:
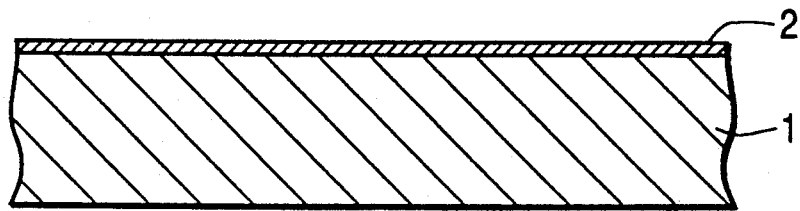
FIG. 9(*a*) through (*h*) are schematic sectional views showing a method of producing the lower substrate shown in FIGS. 7 and 8.
Figure 9B:
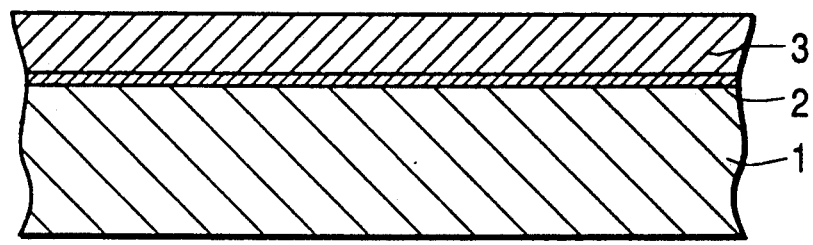
Figure 9C:
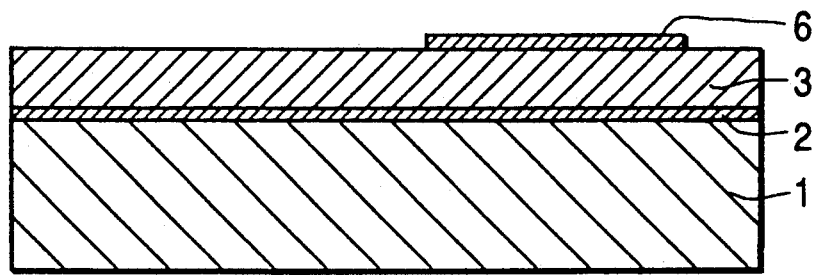
Figure 9D:
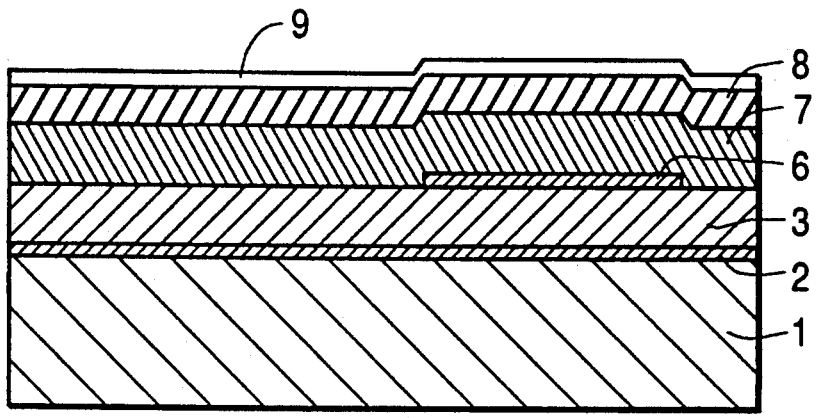
Figure 9E:
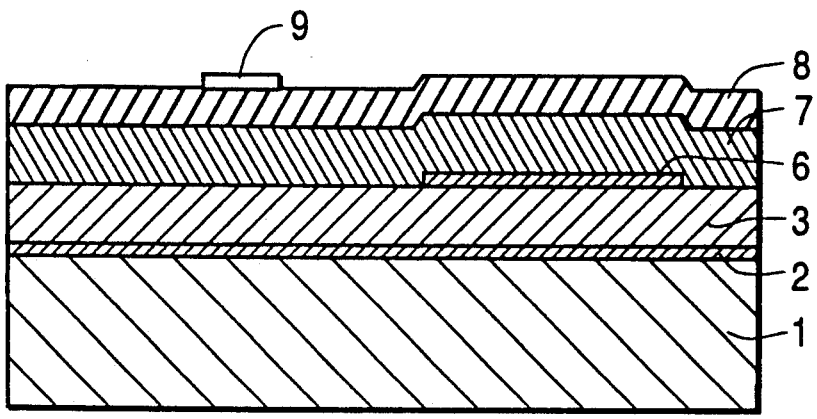
Figure 9F:
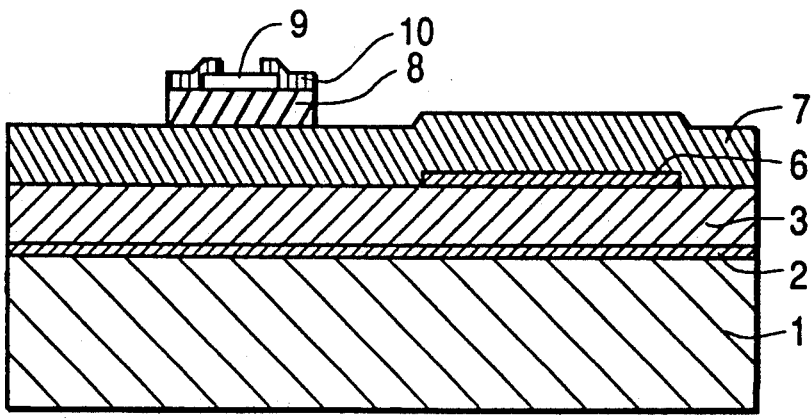
Figure 9G:
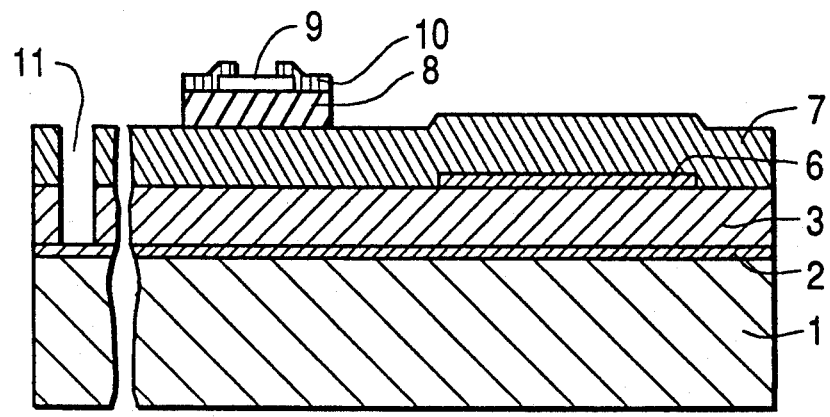
Figure 9H:
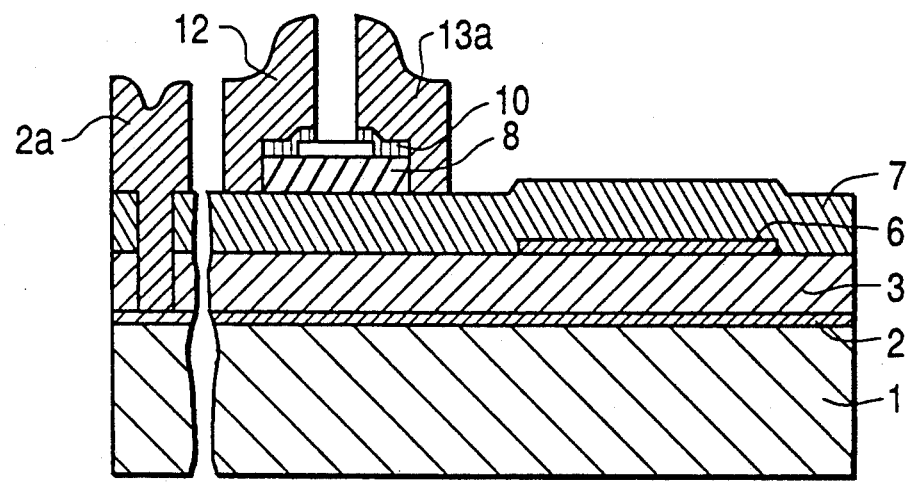

A method of producing the structure shown in FIGS. 7 and 8 will be described hereinafter with reference to FIGS. 9(a) through 9(h). First, a metal layer is sputtered on a transparent insulating substrate 1, and patterned into a gate bus electrode 2 by photolithography as shown in FIG. 9(a). The substrate 1 may be a glass substrate. The gate bus line 2 may be made of Cr, Ti or the like. An insulating layer 3 is formed over the gate bus line formed substrate by sputtering, CVD (chemical vapor deposition) or P-CVD (plasma-CVD) as shown in FIG. 4(b). The insulating layer 3 may be made of $SiO_2$, $SiN_x$ or the like. Next, a conductor layer is sputtered on the insulating layer 3 and patterned into a common electrode 6 by photolithography as shown in FIG. 9(c). The common electrode 6 may be made of a transparent conductor material such as ITO or the like. Next, an insulating layer 7, a semiconductor layer 8 and an insulating layer 9 are formed in this order on the common electrode formed substrate by sputtering, CVD or P-CVD as shown in FIG. 9(d). Each of the insulating layers 7 and 9 may be made of $SiO_2$, $SiN_x$ or the like. The semiconductor layer 8 may be made of a-Si, poly Si or the like. The insulating layer 9 is patterned into a specific pattern at a TFT forming area as shown in FIG. 9(e). Next, on the substrate as shown in FIG. 9(e), an impurity-doped semiconductor layer 10 is formed, and then the semiconductor layer 8 and impurity-doped semiconductor layer 10 are patterned into a specific pattern to form a thin film transistor part as shown in FIG. 9(f). The impurity may be P, B or the like. The impurity-doped semiconductor layer 10 may be p+- or n+-doped a-Si or poly Si. Next, a contact hole 11 for drawing out the gate bus line is formed through the insulating layers 7 and 3 near the periphery of the substrate so that a specific part of the gate bus line 2 is exposed as shown in FIG. 9(g). Finally, a conductor layer is sputtered on the substrate shown in FIG. 9(g), and patterned by photolithography into a source bus line (source electrode) 12, a drain electrode 13a, a pixel electrode and a gate bus draw-out electrode 2a as shown in FIG. 9(h). The source, drain and pixel electrodes may be made of a transparent conductor material such as ITO or the like.

The impurity-doped semiconductor layer may be formed in another manner as shown in FIG. 11. In the structure shown in FIG. 11, impurities are implanted or thermally diffused into a part of the semiconductor layer 8 to change the part of the semiconductor layer into an impurity-doped semiconductor layer 10'.

Figure 10:
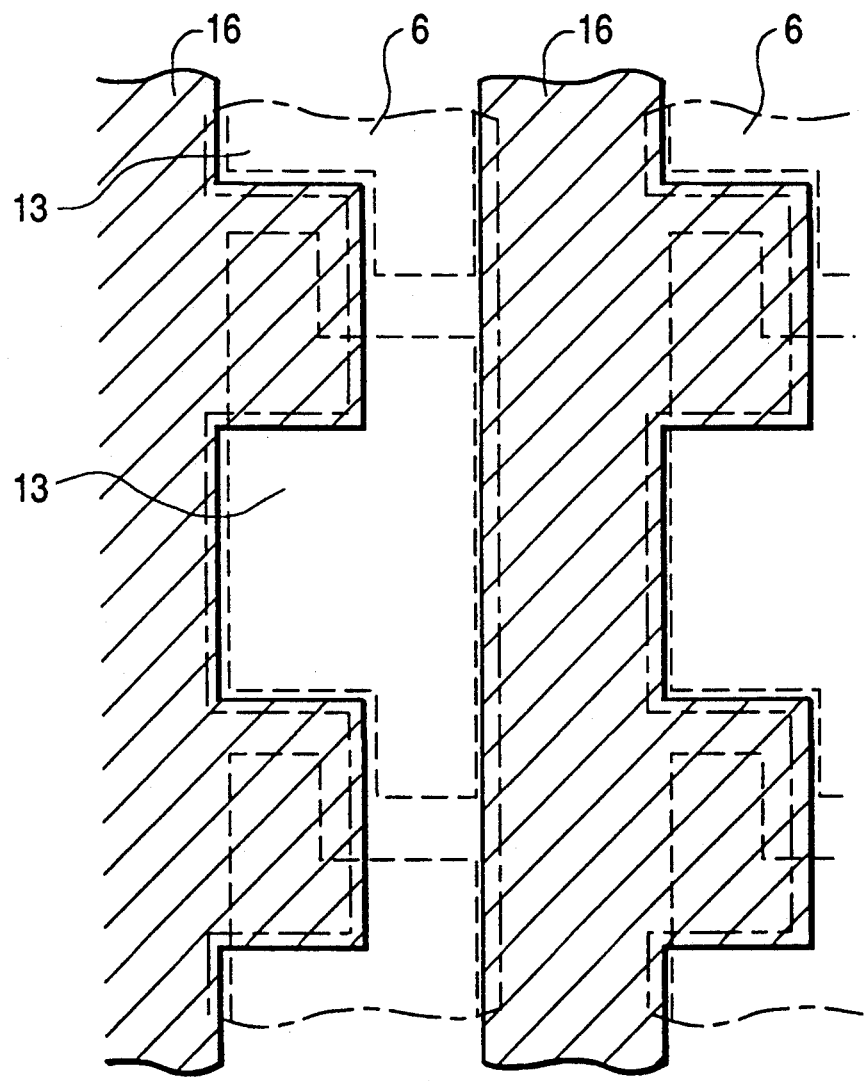
FIG. 10 is a schematic top view showing a black matrix pattern of the liquid crystal display apparatus of the second embodiment.

The black matrix 16 formed on the common counter electrode 14 on the upper substrate 200 has a pattern as shown in FIG. 10. In the pattern shown in FIG. 10, the black matrix 16 has a pattern of black stripes which are arranged only in columns to cover the source bus lines and partly extend along the gate bus line 2 to cover the gate bus lines in areas except for the areas above the common electrodes 6. The black matrix 16 is not formed along the gate bus lines 2 in the area above the common electrode 6. Accordingly, a large effective display area, or large aperture, can be obtained.

What is claimed is:

1. A liquid crystal display apparatus comprising:
   a transistor array substrate having formed thereon an array of pixel electrodes arranged in a matrix to form pixels, an array of switching thin film transistors arranged in a matrix for driving the pixels, respectively, gate bus lines arranged in rows for applying scanning signals to the switching thin film transistors, and source bus lines arranged in columns for applying display data signals to the switching thin film transistors;
   a counter substrate having formed thereon a common counter electrode confronting the pixel electrodes; and
   a liquid crystal layer sandwiched between the transistor array substrate and the counter substrate,
   wherein the transistor array substrate has formed thereon a common electrode disposed below the pixel electrodes through an insulating layer for constituting an auxiliary capacitor between said common electrode and each of the pixel electrodes through the insulating layer, the common electrode being extended to cover an area above each source bus line or each gate bus line through another insulating layer so as to shield the pixel electrodes from the source bus lines or gate bus lines.

2. An apparatus according to claim 1, wherein each of the common electrode and the pixel electrodes is a transparent electrode.

3. An apparatus according to claim 1, wherein the counter substrate has formed thereon a black matrix for covering an area expect for an area above the common electrode.

4. An apparatus according to claim 1, wherein the common electrode is extended to cover an area above each source bus line so as to shied the pixel electrodes from the source bus lines, and the pixel electrodes are extended to cover an area above the source bus lines.

5. A method of producing a transistor array substrate used for a liquid crystal display apparatus in which a liquid crystal layer is sandwiched between the transistor array substrate and a counter substrate, comprising the steps of;
   (a) forming gate bus lines on a transparent insulating substrate;
   (b) forming a first insulating layer on the substrate formed in the step (a);
   (c) forming source bus lines on the first insulating layer;
   (d) forming a second insulating layer on the substrate formed in the step (c);
   (e) forming a common electrode on the second insulating layer in a direction parallel to the gate bus line direction to cover an area above which pixel electrodes are to be later formed and an area above the source bus lines;
   (f) forming a matrix array of thin film transistors each including a semiconductor layer and an impurity-doped semiconductor layer on the substrate formed in the step (e) through a third insulating layer; and
   (g) forming source electrodes and drain electrodes for the thin film transistors, and forming the pixel electrodes each extending from a corresponding one of the drain electrodes, and wherein an auxiliary capacitor is constituted between said common electrode and each of the pixel electrodes through the third insulating layer.

6. A method of producing a transistor array substrate used for a liquid crystal display apparatus in which a liquid crystal layer is sandwiched between the transistor array substrate and a counter substrate, comprising the steps of;
   (a) forming gate bus lines on a transparent insulating substrate;
   (b) forming a first insulating layer on the substrate formed in the step (a);
   (c) forming a common electrode on the first insulating layer in a direction perpendicular to the gate bus line direction to cover an area above which pixel electrodes are to be later formed and an area above the source bus lines;
   (d) forming a matrix array of thin film transistors each including a semiconductor layer and an impurity-doped semiconductor layer on the substrate formed in the step (c) through a second insulating layer; and
   (g) forming source electrodes and drain electrodes for the thin film transistors, and forming the pixel electrodes each extending from a corresponding one of the drain electrodes, and wherein an auxiliary capacitor is constituted between said common electrode and each of the pixel electrodes through the second insulating layer.

* * * * *